United States Patent [19]

Hardigg

[11] 4,380,577
[45] Apr. 19, 1983

[54] STAGGERED TEETH COVER

[75] Inventor: James S. Hardigg, Conway, Mass.

[73] Assignee: Hardigg Industries, Inc., South Deerfield, Mass.

[21] Appl. No.: 306,538

[22] Filed: Sep. 28, 1981

Related U.S. Application Data

[63] Continuation of Ser. No. 135,117, Mar. 28, 1980, abandoned.

[51] Int. Cl.³ .............................................. H01M 2/08
[52] U.S. Cl. .................................... 429/175; 429/82; 429/176; 429/163
[58] Field of Search ............... 429/175, 176, 122, 173, 429/177, 82, 163; 220/366, 367

[56] References Cited

U.S. PATENT DOCUMENTS 3,802,597  4/1974  Miller .............................. 429/175 X
4,009,322  2/1977  Wolf ................................. 429/175
4,124,045  7/1980  Jutte et al. ...................... 429/175 X Primary Examiner—Charles F. LeFevour
Attorney, Agent, or Firm—Cushman, Darby & Cushman

[57] ABSTRACT

A battery jar cover having a guide device depending from the bottom thereof and positioned so as to extend about at least predetermined portions of the periphery of the cover and inwardly from the sides thereof. The guide device is shaped so that it extends downwardly from the bottom of the cover a greater degree adjacent the corners and to a lesser degree adjacent the central portion of each side. Thus, the shape of the depending guide varies in length from the corners to the center thereof along each side.

23 Claims, 3 Drawing Figures

STAGGERED TEETH COVER

This is a continuation of application Ser. No. 135,117 filed Mar. 28, 1980 now abandoned.

BACKGROUND OF THE PRESENT INVENTION

The production of batteries is becoming more and more automated, and as a result it has become increasingly desirable to have more of the assembly work undertaken automatically by machine. In the past many of the processing steps were hand operations as placement of elements and covers sometimes required some hand fitting. As materials have developed in the last few years, it has been possible to continuously decrease the sidewall thickness of battery jars to reduce costs and weight. However, I have found that as the sidewalls of battery jars become increasingly thinner, there is a greater likelihood that the jar's sidewalls will bow inwardly and this problem becomes more compounded as the size of the battery jar increases. Thus, the problems of automating battery production would seem to be further compounded.

Attention is directed to my co-pending application, U.S. patent application No. 087,149 now U.S. Pat. No. 4,276,360, directed to An Improved Battery Jar Cover. One of the significant features of that cover is the provision of a guide device positioned inwardly from the edges which can, for example, take the form of a plurality of legs which extend around the periphery of the cover. These legs help assure the correct shaping of the battery jar sidewalls as the cover is inserted and the formation of accurate and strong welded joints. To ease insertion into the jar each leg has a sloped bottom surface which aids in that insertion.

While I have found that these sloped bottom surfaces on the legs forming the guiding device make this cover relatively easily insertable if the sidewalls of a battery jar are bowed the cover might not be correctly insertable by machine. However, I have found that when automating the cover welding process, by altering the shape of this guide device, I can obtain a type of camming action as the guide is inserted into the battery jar which incrementally pushes the bowed sidewalls out thereby correcting any wall bowing situations. This action can be obtained if the length of the guide device, extending along each side from the corner to the center, varies in length with the guide device at the corners being longer than that portion appearing at or near the center. As battery covers with this modified guide configuration are inserted into the battery jar, the sidewalls are automatically moved outwardly so that none of the legs become engaged on the exterior of the jar's sidewalls and the covers are easily insertable automatically by machine.

This construction produces greater assurance that cover placement will occur correctly and enhances the ability to place covers on jars automatically by machinery prior to welding.

SUMMARY OF THE PREFERRED EMBODIMENT OF THE PRESENT INVENTION

The present invention concerns an improved battery jar cover that includes means for automatically correcting for bowling of the jar's sidewalls when the cover is placed therein making the cover more readily insertable by machinery. Such a cover will improve the output and efficiency of cover welding equipment as the placement of covers on battery jars has, heretofore, usually been accomplished as a manual operation apart from the automatic functioning of the system.

The cover itself is comprised of a main planar plate member which is provided with a centrally located opening and a plurality of terminal post holes, with the number depending upon the size of the battery being constructed. The cover can also have a stepped edge which aids in stacking covers for shipping and which also helps assure that liquids can easily run off the upper surface of the finished battery. However, it should be understood that other cover configurations are also possible.

Covers used in the battery industry have a width dimension that is kept relatively constant. The dimensions commonly used in the industry can be either 6.198 inches or 6.25 inches although it should be understood the concepts set forth herein would apply equally well to any battery covers regardless of dimensions.

The cover is molded from a thermoplastic material, preferably polypropylene, although other thermoplastic or plastic materials could be used as well. It is only necessary that the cover be formed into a fairly rigid plate structure having the desired dimensions with the material being weldable onto the desired type of battery jars.

In the preferred embodiment a flange or skirt member is provided on the bottom side of the cover so that it extends around at least along predetermined portions of the cover's entire periphery. This flange or skirt is spaced inwardly from the outer edges of the cover a first predetermined distance so that a portion of a horizontal bottom surface of the cover extends outwardly from that skirt to the outer peripheral edge of the cover. This horizontal bottom surface of the cover will ultimately become part of the horizontal weld area that connects with the top of the battery jar once the cover is welded into place. At spaced intervals about the cover and along this flange or skirt member, guide pins or legs are provided. These guide pins are preferably thicker than the flange so that they extend beyond the flange both inwardly and outwardly. While a variety of dimensions and sizes can be used for this flange or skirt member as well as the legs or pins, I have found it preferable to have the legs at least extend outwardly beyond this skirt member toward the periphery of the cover for the reasons set forth in my co-pending application, to provide a space for thermoplastic material to flow during the welding operation. This assures a gap or space will be formed between the outer surface of this skirt and the inner surface of the battery jar sidewall and it is within that space or gap that thermoplastic material will flow to produce a consistent and uniform weld about the entire periphery of the seam formed between the battery jar and cover.

As indicated previously, the size of the guide pins or legs located about the periphery of the cover vary in length with the longest pins being placed at the corners while the shortest pins are placed adjacent the midpoint of each side of the cover. By varying the length of the pins from the corners to the center along each side, the pins are formed into a cam-like device and as insertion of the top into the battery jar continues the guide pins will intercept or contact a bowed sidewall of the battery jar in a staggered or sequential manner beginning at the corner of the jar and moving toward the center of the jar's sidewalls. Each successive pin will push the sidewall outwardly an additional incremental distance so as to automatically correct for bowed sidewall conditions.

The pins provided at the corner of the cover can be the longest since the sidewalls will not exhibit a bowed condition adjacent the corners. Rather, bowing will be greatest at the central portion of each sidewall. As each successive pin engages the sidewall, the sidewall will be moved outwardly from its inwardly bowed condition to a straighter position so that by the time the centermost pins are fully inserted, the bowed condition will be completely removed and the sidewalls of the jar will be correctly aligned with the pins and the cover structure.

Other objects, features and characteristics of the present invention as well as the combination of parts and the economies of its manufacture, will become more apparent upon consideration of the following detailed description and the appended claims with reference to the accompanying drawings all of which form part of the specification, wherein like reference numerals designate corresponding parts in the various figures.

DETAILED DESCRIPTION OF THE PREFERRED EXEMPLARY EMBODIMENT OF THE PRESENT INVENTION

Figure 1:
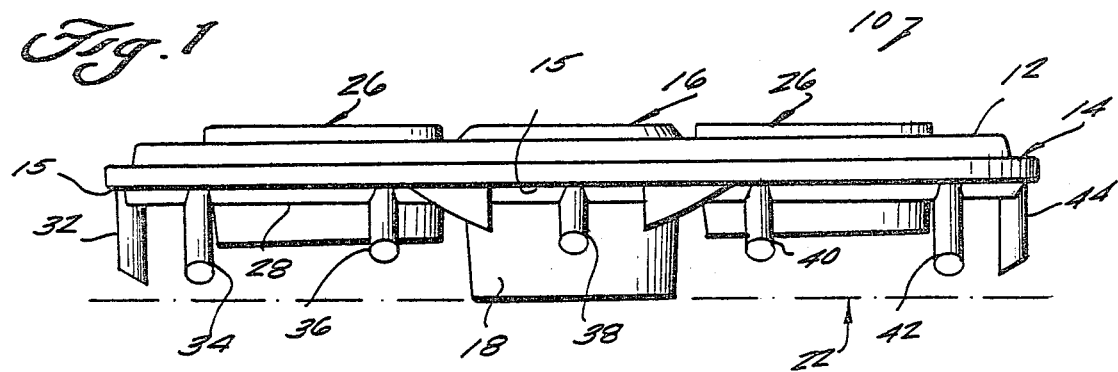
FIG. 1 is a side elevational view of the cover made according to the present invention looking at the side which has the constant width.
Figure 2:
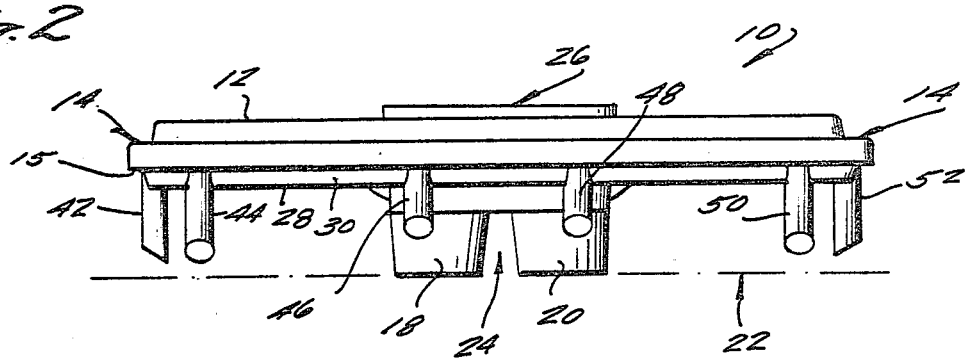
FIG. 2 is a side elevational view of the cover shown in FIG. 1 but from the end showing the length of the cover.

Turning first to FIGS. 1 and 2, the cover according to the present invention is generally indicated at 10 and is comprised of a main plate member 12. The cover is provided with a depending rim portion, generally indicated at 14, although plate member 12 could also be formed as a substantially flat plate.

Cover 10 is provided with a centrally positioned vent hole, generally indicated at 16, which is provided with depending skirt portions 18 and 20, the bottom which define a horizontal plane indicated at 22. A gap 24 is provided between skirt portions 18 and 20 so that the vent hole 16 can collect gases which may accumulate within the battery during its use.

Cover 10 is also provided with a plurality of additional openings indicated at 26, so that terminal posts from electrodes that will subsequently be positioned within the battery jar can extend through cover 10.

Depending downwardly from the bottom surface of cover 10 and extending about the periphery thereof, is a flange or skirt member generally indicated at 28. The height of this skirt member from the bottom surface of the edge portion number 10 is about 0.93 inches and is provided with a front or exterior surface 30 having about a 1 degree taper and a rear surface (not shown) which has about a 3 degree taper with this tapered condition being present to facilitate demolding.

With reference now to FIG. 1, a plurality of guide pins also depend from the bottom surface of cover 14 with these guide pins being indicated at 32-44. The guide pins 32-44 are preferably located at spaced apart locations about the periphery of the cover with the spacings being about one inch along each side. The spacing therebetween the pins at the corners lying on opposite sides may be less than about one inch. Together guide pins 32-44 and the flange and skirt member 28 form a continuous member which extends about the periphery of the bottom edge of the outer portion of cover 10. While guide posts 32-44 can be placed about an inch apart, the exact spacing between the guide pins can be greater or lesser amounts, it only being important that they be spaced close enough together so as to both straighten the upper edge or rim of the battery jar as the cover is placed as the pins are inserted into the battery jar and so that the sidewalls will not be rippled when the cover and the pins are in place. Likewise, it is also important that enough pins be used to provide sufficient camming action during insertion to cure any bowing problems that may be present in the sidewalls of the battery jar.

The length of corner pins 32 and 34 and 42 and 44, respectively, as shown in FIG. 1, have a length of approximately three quarters of an inch (0.75 inches) and are provided with sloped bottom surfaces, having a taper of approximately 30 degrees although greater or lesser amounts of taper could be employed as this surface really serves as a guide to help insert the guide pins into the battery jar.

The next guide pins positioned along the side shown in FIG. 1, specifically pins 36 and 40, are shorter and have a length of approximately 0.62 inches whereas the centralmost guide pin 38 is shorter and yet has a length of about ½ inch (0.50 inches).

As shown in FIG. 1, plane 22 established by the bottom of skirts 18 and 20 lies below the bottom of the longest guide pins 32, 34, 42 and 44. When these pins are about 0.75 inches in length, a gap of about 0.2 inches exists between these pins and plane 22. Thus, the corner pins could be 0.2 inches longer with the cover still being equally as stackable for shipping purposes if the cover had a flat upper surface. Alternatively, for the structure shown in FIG. 1, the length of these corner posts could also be extended by an extra distance equal to the depth of the recessed outer edge indicated at 14. In any event, it is only desirable to have the corner pins relatively longer and the more centrally located pins along each side shorter so as to insure proper initial placement of cover 10 within a battery jar.

Turning next to FIG. 2 which shows the length of the cover shown in FIG. 1, the centrally located pins on this side, indicated at 46 and 48, have a length of about ½ inch (0.50 inches) which are equal in length to the most centrally located pin 38 shown in FIG. 1.

Figure 3:
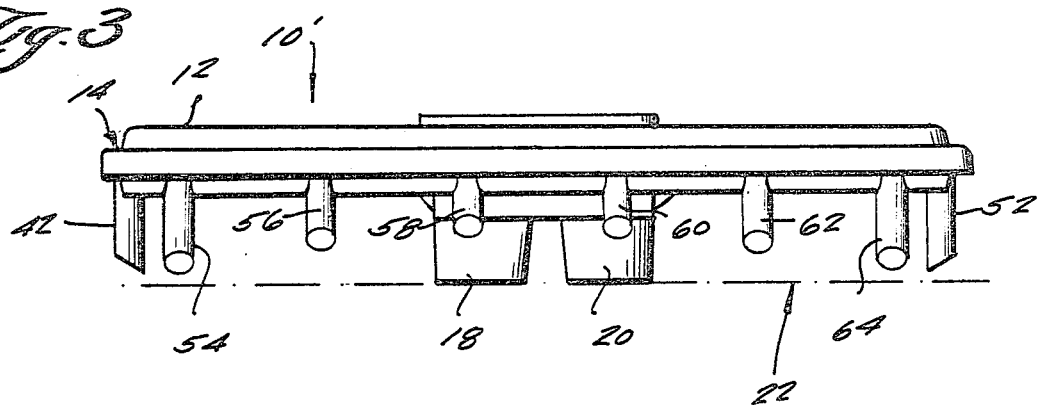
FIG. 3 is a side elevational view of a second embodiment of a cover according to the present invention having a length longer than that of the cover shown in FIG. 2.

In FIG. 3, a longer battery cover is shown with six guide pins being employed instead of four as shown in FIG. 2. These guide pins are indicated by reference numerals 54-64. The outer or corner guide pins 54 and 64 have a length of about 182 inches (0.75 inches) whereas the next most inward set, guide pins 56 and 62, have a length of about 0.62 inches with guide pins 58 and 60 located in the central portion of the side have a length of ½ inch (0.50 inches) similar to the centrally positioned guide pins 46, 48 and 38 in the first embodiment shown in FIGS. 1 and 2.

Reference to my above identified co-pending application will indicate how covers built according to the present invention can be welded into place within battery jars and all of that disclosure is incorporated herein by reference thereto. In that regard, it is important to note that the shortest pins, namely those located in the center of each side, need only be longer than the height to which cover 10 is raised upwardly out of the battery jar during the welding operation. This will assure that those particular guide pins will not be removed from engagement with the interior surface of the battery jar sidewall so that following the heating cycle the cover can be easily and quickly accomplished without losing the desired registry between the pins and the sidewalls of the battery jar established following their initial insertion into that battery jar.

While the invention has been described in connection with what is presently conceived to be the most practical and preferred embodiment, it is to be understood that the invention is not to be limited to the disclosed embodiment, but on the contrary, is intended to cover various modifications and equivalent arrangements included within the spirit and scope of the appended claims, which scope is to be accorded the broadest interpretation of such claims so as to encompass all such equivalent modified structures and methods.

What I claim is:

1. A cover for a thermoplastic battery jar having relatively thin side walls which have a tendency to bow inwardly, said cover being comprised of a thermoplastic plate member having a predetermined thickness, top and bottom surfaces and four edges, a plurality of means defining openings extending through said plate member, and guide means, positioned at predetermined locations solely around the periphery of said plate member and extending downwardly away from said bottom surface, for interacting with the interior of said thin side walls of said battery jar and for aligning the cover therewith, said guide means being spaced inwardly a predetermined distance from said edges, said guide means having a length that varies from a first predetermined length at the corners of said cover to a second shorter predetermined length adjacent the central portion of each edge.

2. A cover as in claim 1 wherein the shape of said guide means along each edge is in the form of an inverted V.

3. A cover as in claim 1 wherein said first predetermined length varies from about ½ to about ¾ of an inch and said second predetermined length varies from about ⅜ inches to about ½ of an inch.

4. A cover as in claim 1 wherein one of said openings comprises a vent hole.

5. A cover as in claim 1 wherein said guide means comprises a plurality of separated guide posts.

6. A cover as in claim 5 wherein said guide posts are spaced apart substantially regularly about said cover.

7. A cover as in claim 1 wherein said guide means includes a plurality of spaced apart members extending along each of said edges.

8. A cover as in claim 5 or 7 wherein said guide means further includes discontinuous skirt portions depending from said bottom surface and positioned at predetermined locations.

9. A cover as in claim 9 wherein said discontinuous skirt portions are offset inwardly from the remainder of said guide means in contact with the battery jar so that a passage is provided between said discontinuous skirt portions and the battery jar.

10. A battery jar cover comprised of a plate member having top, bottom and outer peripheral side surfaces that cooperate to define four sides and four corners and a plurality of openings extending therethrough, said cover further including a guide structure extending downwardly away from said bottom surface and solely about the periphery of said cover at predetermined locations, said guide structure being spaced inwardly from the sides of said cover and shaped so as to extend away from the bottom surface a shorter distance adjacent the central portion of a side than adjacent the corners defining that side.

11. A cover as set forth in claim 10 wherein said guide structure includes a plurality of separated guide members spaced from one another at predetermined distances and flange members extending downwardly from said bottom surface and extending between at least predetermined one of said guide members.

12. A cover as set forth in claim 10 wherein said guide structure is shaped substantially in the form of an inverted V.

13. A cover as set forth in claim 10 wherein said guide structure extends away from said bottom surface at distances which vary from at first predetermined length at the corners of said cover to a second predetermined distance adjacent the central portion of a side.

14. A cover as in claim 13 wherein said first predetermined length varies from about ½ to about ¾ of an inch and said second predetermined length varies from about ⅜ inches to about ½ of an inch.

15. A cover as in claim 10 wherein one of said openings comprises a vent hole.

16. A cover as in claim 10 wherein said guide structure comprises a plurality of separated guide posts.

17. A cover as in claim 16 wherein said guide posts are spaced apart substantially regularly along each side of said cover.

18. A cover as in claim 10 wherein said guide means includes a plurality of spaced apart members extending along each of said sides.

19. A cover as in claims 16 or 18 wherein said guide means further includes discontinuous skirt portions depending from said bottom surface and positioned at predetermined locations.

20. A cover as in claim 18 wherein said discontinuous skirt portions are offset inwardly from the remainder of said guide structure in contact with the battery jar so that a passage is provided between said discontinuous skirt portions and the battery jar.

21. A cover for a thermoplastic battery jar having relatively thin side walls comprised of a thermoplastic member having a predetermined thickness, top and bottom surfaces and four edges, a plurality of means defining openings extending through said plate member, and guide means positioned at least at predetermined portions about said plate member and depending away from said bottom surface for engaging at least complementary predetermined portions of the interior surface of the battery jar side walls and for aligning the cover therewith, said guide means for engaging the interior surfaces of said thin side walls being spaced inwardly a predetermined distance from said edges solely about said predetermined portions of the periphery of said cover and having a length that varies from a first predetermined length at predetermined corners of said cover to a second, shorter predetermined length at the central portion between said predetermined corners.

22. A cover as in claim 21 wherein said guide means includes a depending flange and a plurality of guide elements that depend below said flange and extend outwardly toward the edges of the cover a predetermined distance, said guide elements varying in length between said first and second predetermined lengths.

23. A covered battery jar comprising a battery jar including a base and four relatively thin, upstanding side walls having a tendency to bow inwardly prior to assembly of the cover thereon, cover means defining top and bottom surfaces for covering said battery jar, and including means defining at least one opening extending through said top and bottom surfaces; and guide means depending from said bottom surface at predetermined locations solely around the periphery thereof for engaging and straightening the inwardly bowed thin side walls, said guide means depending below said bottom surface a greater depth at predetermined corners thereof and gradually decreasing in said depending depth along the sides of said cover between said predetermined corners so that said guide means will first engage said battery jar at said predetermined corners thereof, and thereafter relative movement between said cover means and said battery jar will responsively cause that portion of said guide means having the next successively decreasing depending depth to engage an associated portion of the inwardly bowed side walls thereby successively decreasing the inward bow thereof.

* * * * *